(12) United States Patent
Komatsu et al.

(10) Patent No.: US 8,592,522 B2
(45) Date of Patent: Nov. 26, 2013

(54) OXYGEN-ABSORBING RESIN COMPOSITION AND LAMINATE

(75) Inventors: Ikuo Komatsu, Kanagawa (JP); Hiroaki Goto, Kanagawa (JP); Shigenobu Murakamai, Kanagawa (JP); Takayuki Ishihara, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 414 days.

(21) Appl. No.: 11/064,149

(22) Filed: Feb. 23, 2005

(65) Prior Publication Data

US 2005/0142373 A1 Jun. 30, 2005

Related U.S. Application Data

(63) Continuation of application No. PCT/JP03/10657, filed on Aug. 22, 2003.

(30) Foreign Application Priority Data

Aug. 23, 2002 (JP) .................................. 2002-243238

(51) Int. Cl.
*C08L 53/00* (2006.01)
*C08F 8/00* (2006.01)
*B32B 27/00* (2006.01)
*B32B 27/32* (2006.01)

(52) U.S. Cl.
USPC ............... 525/95; 525/98; 525/360; 428/500; 428/523

(58) Field of Classification Search
USPC ............ 428/36.6, 36.7, 220, 482; 525/57, 61, 525/360, 370
See application file for complete search history.

(56) References Cited

U.S. PATENT DOCUMENTS

| 4,536,454 A | * | 8/1985 | Haasl ............................. 428/516 |
| 5,073,614 A | * | 12/1991 | Shih et al. ..................... 526/258 |
| 5,310,497 A | | 5/1994 | Ve Speer et al. |
| 5,399,289 A | * | 3/1995 | Speer et al. .............. 252/188.28 |
| 5,776,361 A | * | 7/1998 | Katsumoto et al. ...... 252/188.28 |

(Continued)

FOREIGN PATENT DOCUMENTS

| EP | 0 519 616 | 12/1992 |
| EP | 0 033 080 | 9/2000 |

(Continued)

OTHER PUBLICATIONS

Official Action dated Jan. 15, 2008 from the Japanese Patent Office.

*Primary Examiner* — Kevin R Kruer
(74) *Attorney, Agent, or Firm* — Hoffmann & Baron, LLP

(57) ABSTRACT

The object of the present invention is to provide an oxygen-absorbing resin composition having a high oxygen absorbability and capable of absorbing oxygen for a long period of time. The present invention provides an oxygen-absorbing resin composition comprising polyolefin resin (A) obtained by polymerizing an olefin having 2 to 8 carbon atoms, resin (B) which is other than resin (A) and which acts as a trigger for the oxidation of resin (A), and transition metal catalyst (C), wherein resin (B) is dispersed in the matrix of resin (A) so that the oxidation reaction of matrix resin (A) is caused and thus oxygen is absorbed when the oxygen-absorbing resin composition is brought into contact with oxygen. This oxygen absorbing resin composition has a high oxygen absorbability and is advantageous in cost because oxygen is absorbed in resin (A).

12 Claims, 1 Drawing Sheet

(56) References Cited

U.S. PATENT DOCUMENTS

| | | | |
|---|---|---|---|
| 5,811,027 A * | 9/1998 | Speer et al. | 252/188.28 |
| 5,981,676 A * | 11/1999 | Gauthier et al. | 526/308 |
| 6,311,524 B1 * | 11/2001 | Brennan et al. | 65/378 |
| 6,464,896 B1 * | 10/2002 | Speer et al. | 252/188.28 |
| 6,514,357 B1 * | 2/2003 | Tada et al. | 148/251 |
| 6,599,598 B1 * | 7/2003 | Tai et al. | 428/36.6 |
| 6,906,146 B2 * | 6/2005 | Ching et al. | 525/370 |

FOREIGN PATENT DOCUMENTS

| | | | |
|---|---|---|---|
| EP | 1 067 154 | | 1/2001 |
| JP | 2001-39475 | | 7/1980 |
| JP | 05-051048 | * | 3/1993 |
| JP | 05-097164 | | 4/1993 |
| JP | 05097164 A | | 4/1993 |
| JP | 8-502306 | | 5/1993 |
| JP | 5-209097 | | 8/1993 |
| JP | 5-295171 | | 11/1993 |
| JP | 5294171 | | 11/1993 |
| JP | 07-112769 | * | 5/1995 |
| JP | 5-115776 | | 3/1996 |
| JP | 11-80555 A | | 3/1999 |
| JP | 62-1824 | | 2/2001 |
| JP | 2001-031759 | | 2/2001 |
| JP | 2001-040226 | | 2/2001 |
| JP | 2001-72873 | | 3/2001 |
| JP | 2001-106886 | | 4/2001 |
| JP | 2001-106920 | | 4/2001 |
| JP | 3218040 | | 8/2001 |
| JP | 2002-155214 A | | 5/2002 |
| WO | WO 94/07379 | | 4/1994 |

* cited by examiner

OXYGEN-ABSORBING RESIN COMPOSITION AND LAMINATE

This application is a continuation of International PCT Application No. PCT/JP2003/010657, filed Aug. 22, 2003 which claims priority to Japanese Patent Application No. 2002-243238 filed on Aug. 23, 2002, the contents all of which are incorporated herein by reference.

BACKGROUND OF THE INVENTION

The present invention relates to an oxygen-absorbing resin composition and a laminate thereof.

Recently, various plastic containers have been used for the packaging because of their advantages such as light weight, transparency and easiness of molding.

Because an oxygen barrier property of the plastic containers is lower than that of metal containers and glass containers, the plastic containers have problems in that the contents of the containers are denatured and the flavor thereof is reduced.

For preventing these problems the plastic container walls have a multi-layer structure in which at least one layer is made of a resin having an excellent oxygen barrier property such as ethylene/vinyl alcohol copolymer. There are other kinds of containers having an oxygen-absorbing layer for absorbing oxygen remaining in the containers and also oxygen penetrating into the containers from the outside. Oxygen absorbers (disoxidants) used for forming the oxygen-absorbing layer include, for example, those mainly containing a reducing substance such as iron powder (see, for example, Official Gazette of Japanese Patent Kokoku No. Sho 62-1824) and those containing an oxygen scavenger composed of an ethylenically unsaturated hydrocarbon and a transition metal catalyst (Official Gazettes of Japanese Patent Kokai Nos. 2001-39475 and Hei 5-115776 and Japanese Patent Kohyo No. Hei 8-502306).

However, although a method wherein an oxygen absorber such as iron powder is incorporated into a resin to be used for forming a packaging material for a container wall is satisfactory in regard to the oxygen absorbing capacity, the use of the packaging material is limited to the field of packages, in which a high transparency is not required, because the resin is colored a specified hue. In the method wherein the oxygen scavenger composed of an ethylenically unsaturated hydrocarbon and a transition metal catalyst is used, a relatively large amount of the ethylenically unsaturated hydrocarbon must be used because the ethylenically unsaturated hydrocarbon per se absorbs oxygen to exhibit the oxygen barrier property. However, when the relative amount of the ethylenically unsaturated hydrocarbon is increased, a problem in which the moldability and transparency of the resin composition deteriorates occurs. The period of effectively absorbing oxygen is limited under these conditions. Therefore, this method cannot satisfy the requirement of storage for a long period of time. In addition, coloring and a smell are caused by the absorption of oxygen.

DISCLOSURE OF THE INVENTION

Under the above-described circumstances, the object of the present invention is to provide an oxygen-absorbing resin composition having a high oxygen absorbability, capable of absorbing oxygen for a long period of time and free from coloring or a smell caused by the absorption of oxygen.

After investigations were conducted for solving this problem, the inventors have found that oxygen absorption of a resin composition can be remarkably improved by forming the resin composition comprising specified amounts of polyolefin resin (A) obtained by polymerizing an olefin having 2 to 8 carbon atoms, resin (B) which is a resin other than resin (A) and which acts as a trigger for the oxidation of resin (A), and transition metal catalyst (C), because resin (B) acts as the trigger for the oxidation of polyolefin resin (A) so that polyolefin resin (A) absorbs oxygen. The present invention has been completed on the basis of this finding.

Thus, the present invention provides an oxygen-absorbing resin composition comprising polyolefin resin (A) obtained by polymerizing an olefin having 2 to 8 carbon atoms, resin (B) which is a resin other than resin (A) and which acts as a trigger for the oxidation of resin (A), and transition metal catalyst (C), wherein resin (B) is dispersed in the matrix of resin (A) so that the oxidation reaction of matrix resin (A) is caused and thus oxygen is absorbed when the oxygen-absorbing resin composition is brought into contact with oxygen.

The present invention also provides a laminate having at least one layer containing the above-described oxygen-absorbing resin composition.

BRIEF DESCRIPTION OF THE DRAWING

FIG. 1 is a scanning electron micrograph of a section of a bottle body wall containing the oxygen absorbing resin composition of the present invention in its intermediate layer.

BEST MODE FOR CARRYING OUT THE INVENTION

[Oxygen-Absorbing Resin Composition]

The oxygen-absorbing resin composition of the present invention comprises polyolefin resin (A) obtained by polymerizing an olefin having 2 to 8 carbon atoms, resin (B) which is a resin other than resin (A), and transition metal catalyst (C), wherein resin (B) acts as a trigger to cause the oxidation of resin (A).

Polyolefin resins (A) obtained by polymerizing an olefin having 2 to 8 carbon atoms include, for example, low density polyethylene, medium density polyethylene, high density polyethylene, linear low density polyethylene, linear ultra-low density polyethylene, isotactic or syndiotactic polypropylene, ethylene/propylene copolymer, polybutene-1, ethylene/butane-1 copolymer, propylene/butane-1 copolymer, ethylene/propylene/butane-1 copolymer, ethylene/vinyl acetate copolymer, ion crosslinked olefin copolymers and blends of them. Acid-modified olefin resins obtained by graft-modifying the above-described resins as the base polymers with an unsaturated carboxylic acid or a derivative thereof are also usable. Preferred polyolefin resins are ethylene copolymers having an ethylene structure in the molecular structure of them, such as low density polyethylene, medium density polyethylene, high density polyethylene, linear low density polyethylene, linear ultra-low density polyethylene, ethylene/propylene copolymer and ethylene/butane-1 copolymer. The low density polyethylene or linear low density polyethylene is particularly preferred. One of these resins or a combination of two or more of them may be used.

In ordinary oxygen absorbents such as an oxygen scavenger comprising an ethylenically unsaturated hydrocarbon and a transition metal catalyst as disclosed in Japanese Patent Kokai No. Hei 5-115776, oxygen absorption varies depending on the number of the unsaturated bonds of the ethylenically unsaturated hydrocarbon. The oxygen scavenger is usually incorporated into another thermoplastic resin depending on the use thereof. When the relative amount of the oxygen scavenger is increased, the durability and moldability of the resin composition are reduced and the transparency thereof is lowered. Thus, the amount of the oxygen scavenger is limited and the oxygen absorption of the resin composition is also limited.

In the oxygen-absorbing resin composition of the present invention, resin (B) is preferably in the state of being dispersed in resin (A) matrix. Resin (B) is dispersed in the form of fine particles having an average particle diameter of preferably 10 µm or less, more preferably 5 µm or lesser. By the trigger function of resin (B) homogeneously dispersed in resin (A) matrix, resin (A) per se functions as the oxygen absorbent. Namely, because the matrix resin per se absorbs oxygen, the oxygen-absorbing resin composition of the present invention is capable of absorbing an amount of oxygen far larger than the amount of oxygen absorbed by the ordinary oxygen scavenger. Accordingly, the resin composition of the present invention is capable of effectively absorbing oxygen for a period longer than that of the ordinary oxygen scavenger. The amount of resin (B) is as small as possible without preventing the trigger function and also without damaging the moldability of matrix resin (A). Another advantage of the resin composition of the present invention is the reduction in the cost because oxygen can be absorbed in the commodity resin.

Resin (A) is preferably contained in a relatively large amount so as to make the matrix formation possible and also to absorb a large amount of oxygen by the oxidation. Resin (A) content is preferably in the range of 90 to 99% by weight, more preferably 92.5 to 97.5% by weight. Preferably, resin (B) content is relatively low so that resin (B) can be kept dispersed in resin (A) matrix and also so that it can sufficiently exhibit its function as the trigger for the oxidation of resin (A). From the view point of the moldability of the composition in the production of films, sheets, cups, trays, bottles or tubes, resin (B) content is preferably in the range of 1.0 to 10.0% by weight, more preferably 2.5 to 7.5% by weight. The state of the dispersion of resin (B) in resin (A) matrix can be easily observed with an electron microscope. For example, FIG. 1 shows a scanning electron micrograph (JSM-6300F; JEOL) of a section of a bottle body wall having an intermediate layer comprising the resin composition comprising 100 parts by weight of a low-density polyethylene, 5 parts by weight of styrene/isoprene/styrene triblock copolymer resin and a transition metal catalyst. It is understood from FIG. 1 that resin (B) particles having an average particle diameter of about 1 µm are homogeneously dispersed in resin (A) matrix.

Resins (B) are resins which are different from resins (A) and which work as triggers for the oxidation of resins (A). Resins (B) include, for example, resins having an aliphatic carbon-to-carbon double bond in the main chain or side chain thereof, resins having a tertiary carbon atom in the main chain thereof and resins having an active methylene group in the main chain.

One of resins (B) or a combination of two or more of them may be contained in resins (A).

Resins (B) having an aliphatic carbon-to-carbon double bond in the main chain or side chain thereof include resins containing a unit derived from a linear or cyclic, conjugated or non-conjugated polyene.

These monomers include, for example, conjugated dienes such as butadiene and isoprene; non-conjugated linear dienes such as 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene; non-conjugated cyclic dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene; and trienes such as 2,3-diisopropylidene-5-norbornene, 2-ethylidene-3-isopropylidene-5-norbornene and 2-propenyl-2,2-norbornadiene.

Concrete examples of the polymers include poly-1,2-butadiene, poly-1,4-butadiene, poly-1,2-isoprene, poly-1,4-isoprene, styrene/butadiene copolymer, styrene/isoprene copolymer and ethylene/propylene/diene copolymers.

As resins (B) having a tertiary carbon atom in the main chain, polymers or copolymers containing a unit derived from an α-olefin having 3 to 20 carbon atoms, or polymers or copolymers having a benzene ring in a side chain thereof are preferably used. Concrete examples of the α-olefins include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. In particular, concrete examples of the polymers include polypropylene, poly-1-butene, poly-1-hexene, poly-1-octene, ethylene/propylene copolymer, ethylene/butane-1 copolymer and ethylene/propylene/1-butane copolymer. The monomers having a benzene ring in a side chain thereof include alkenylbenzenes such as styrene, 3-phenylpropene and 2-phenyl-2-butene. Concrete examples of the polymers include polystyrene and styrene copolymers.

Resins (B) having an active methylene group in the main chain are resins having an electron attracting group, in particular, a carbonyl group, and an adjacent methylene group in the main chain thereof. Concretely, resins (B) include copolymers of carbon monoxide and an olefin, in particular, a carbon monoxide/ethylene copolymer.

As resins (B), polystyrene or styrene copolymers having a benzene ring in the side chain are particularly preferred from the viewpoint of their function as the trigger in the oxidation of resin (A).

In the styrene copolymers, a content of the styrene moiety is preferably 10% by weight or more of the styrene copolymers in view of the radical-forming efficiency and more preferably 15 to 50% by weight of the styrene copolymers.

When the styrene copolymers are block copolymers, they have the advantages of a high compatibility with resins (A) and a high dispersibility.

From the viewpoint of the mechanical properties of the resin composition, the styrene copolymers are preferably block copolymers having a polystyrene block in a terminal moiety of the molecule. From the viewpoint of the trigger effect on resin (A), the styrene copolymers are preferably block copolymers having an isoprene unit.

Namely, resins (B) are preferably styrene copolymers such as styrene/isoprene copolymers. They are particularly preferably styrene/isoprene/styrene triblock copolymers belonging to the styrene/isoprene copolymers.

The resins having an aliphatic carbon-to-carbon double bond in the main chain or side chain thereof, the resins having a tertiary carbon atom in the main chain thereof and the resins having an active methylene group in the main chain thereof included in resins (B) are preferably those having 0.018 eq/g or less, more preferably in the range of 0.0001 to 0.015 eq/g, of a carbon-to-carbon double bond except for the benzene ring in view of the heat stability during forming of the resin composition and the trigger effect on the oxidation of resin (A).

In the oxygen-absorbing resin composition of the present invention, the amount of carbon-to-carbon double bond other than those of the benzene ring is preferably 0.001 eq/g or less, more preferably in the range of 0.00001 to 0.0007 eq/g. But when the amount of carbon-to-carbon double bond other than those of the benzene ring is excessive, the oxidation of resin (A) is inclined to be inhibited.

Although the molecular weight of resin (B) is not particularly limited, the number average molecular weight thereof is preferably in the range of 1,000 to 500,000, more preferably 10,000 to 250,000, in view of the dispersibility of resin (B) in resin (A).

The metals in transition metal catalysts (C) used in the present invention include the Group VIII metals of the periodic table such as iron, cobalt and nickel, Group I metals of the periodic table such as copper and silver, Group IV metals of the periodic table such as tin, titanium and zirconium, Group V metals of the periodic table such as vanadium, group VI metals of the periodic table such as chromium and group VII metals of the periodic table such as manganese. Preferred metals in transition metal catalysts (C) are Group VIII metals of the periodic table such as iron, cobalt and nickel. Cobalt is particularly preferred because the oxygen-absorption rate of the resin composition is high.

Transition metal catalysts (C) are used in the form of inorganic acid salts, organic acid salts or complex salts of the above-described transition metals having a low valence.

The inorganic acid salts include halides such as chlorides, sulfur oxy acid salts such as sulfates, nitrogen oxy acid salts such as nitrates, phosphorus oxy acid such as phosphates, and silicates.

The organic acid salts are, for example, carboxylates, sulfonates and phosphonates. The carboxylates are preferred among these salts. Examples of the organic acid salts of transition metals include transition metal salts of acetic acid, propionic acid, isopropionic acid, butanoic acid, isobutanoic acid, pentanoic acid, isopentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linoleic acid, linolenic acid, arachidonic acid, formic acid, oxalic acid, sulfamic acid and naphthenic acid.

The transition metal complexes used herein are complexes with β-diketones or β-keto-acid esters. The β-diketones and β-keto-acid esters usable herein are, for example, acetylacetone, ethyl acetoacetate, 1,3-cyclohexadione, methylene-bis-1,3-cyclohexadione, 2-benzyl-1,3-cyclohexadione, acetyltetralone, palmitoyltetralone, stearoyltetralone, benzoyltetralone, 2-acetylcyclohexanone, 2-benzoylcyclohexanone, 2-acetyl-1,3-cyclohexanedione, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl)methane, benzoylacetylphenylmethane, stearoyl(4-methoxybenzoyl)methane, butanoylacetone, distearoylmethane, acetylacetone, stearoylacetone, bis(cyclohexanoylmethane and dipivaloylmethane. In the present invention, one of the transition metal catalysts (C) or a combination of two or more of them can be used.

Transition metal catalyst (C) is preferably present at least in resin (A). This catalyst can accelerate the progress of the oxidation reaction of resin (A) to efficiently absorb oxygen. More preferably, transition metal catalyst (C) can be present in both resin (A) and resin (B) to accelerate the trigger function of resin (B). The amount of transition metal catalyst (C) is such that it can accelerate the oxidation reaction of resin (A) according to the characteristic feature of the transition metal catalyst used. For sufficiently accelerating the oxidation reaction of resin (A) and also for preventing the reduction of the moldability of the resin composition due to the deterioration of the flowing characteristics, the amount of transition metal catalyst (C) is generally preferably in the range of 10 to 3000 ppm, more preferably in the range of 50 to 1000 ppm.

Although the mechanism for producing the effect of the trigger function of resin (B) in the oxygen-absorbing resin composition of the present invention has not yet been fully elucidated, the present inventors estimate the mechanism is as described below, which by no means limits the mechanism for producing the function of the trigger.

It is considered that in the oxygen-absorbing resin composition of the present invention, hydrogen is drawn out of resin (B) by transition metal catalyst (C) to form a radical in resin (B). Then, hydrogen is drawn out of resin (A) by the attack of this radical and transition metal catalyst (C) to also form a radical in resin (A). Supposedly, when oxygen is brought into contact with resin (A) in the presence of the radical thus formed, the primary oxidation of resin (A) occurs. Thereafter, the chain oxidation reaction of resin (A) proceeds according to the theory of autoxidation by the action of the transition metal catalyst. Thus, resin (A) per se functions as the oxygen absorbent.

As described above, in the estimated mechanism for producing the function, it is important that at first the radical of resin (B) be formed in the presence of transition metal catalyst (C). Therefore, resin (B) preferably has a carbon-to-hydrogen bond from which hydrogen is more easily drawn out than from a methylene chain. When such a resin (B) is used, the radical can be efficiently fed and an excellent trigger function can be exhibited. As an index of the easiness of the drawing of hydrogen, for example, C—H bond dissociation energy can be mentioned. This bond dissociation energy is an energy required for cleaving a specified C—H bond in the molecule (radical). Representing the molecule (radical) by R—H, the bond dissociating energy of the C—H bond is represented as an enthalpy change in the following reaction, and the value thereof can be determined by, for example, the calculation of the molecular orbital. Typical values thus determined are shown in Table 1 (Kagaku Binran Kiso Hen, the second edition, Nihon Kagakukai Corporation, published by Maruzen Co., Ltd.)

$$R\text{—}H(g) \rightarrow R(g) + H(g)$$

TABLE 1

| Bond (R—H) | Bond dissociation energy (kJ mol$^{-1}$) |
|---|---|
| $CH_3CH_2$—H | 410 |
| $H(CH_3)_2C$—H | 395 |
| $(CH_3)_3C$—H | 381 |
| $C_6H_5CH_2$—H | 356 |
| $CH_2\!\!=\!\!CHCH_2$—H | 366 |

In the process for producing the oxygen-absorbing resin composition of the present invention, the above-described 3 components, i.e. (A) to (C), can be separately mixed or two of the three components can be previously mixed together and the obtained mixture can be mixed with the remaining component. For example, resin (A) is previously mixed with resin (B) and the obtained mixture is further mixed with transition metal catalyst (C); or resin (A) is previously mixed with transition metal catalyst (C) and the obtained mixture is further mixed with resin (A).

Resin (A) and/or resin (B) can be mixed with transition metal catalyst (C) by various methods. For example, transition metal catalyst (C) is dry-blended with the resin; or transition metal catalyst (C) is dissolved in an organic solvent, then the obtained dispersion liquid is mixed with the powdery or granular resin and, if necessary, the obtained mixture is dried in an inert atmosphere. Because the amount of transition metal catalyst (C) is smaller as compared with that of the resin, a method which comprises the steps of dissolving transition metal catalyst (C) in an organic solvent and mixing the obtained dispersion liquid with a powdery or granular resin to obtain a homogeneous blend is preferred.

The solvents usable herein for transition metal catalyst (C) include alcohol solvents such as methanol, ethanol and butanol, ether solvents such as dimethyl ether, diethyl ether, methyl ethyl ether, tetrahydrofuran and dioxane, ketone solvents such as methyl ethyl ketone and cyclohexanone, and hydrocarbon solvents such as n-hexane and cyclohexane. The concentration of transition metal catalyst (C) is preferably 5 to 90% by weight.

It is preferred to mix resin (A), resin (B) and transition metal catalyst (C) together and also to store the obtained composition in a non-oxidizing atmosphere so that the composition is not oxidized before use. Namely, the mixing and storage are preferably conducted under reduced pressure or in a nitrogen stream.

An extrusion molding machine or injection molding machine of the vent type or such a machine with a dryer is preferably used because the mixing and drying can be conducted prior to the molding step and also because no special consideration for the storage of the resin containing the transition metal catalyst is unnecessary.

It is also possible to prepare a masterbatch of the resin containing the transition metal catalyst in a relatively high concentration and then to dry-blend the obtained masterbatch with another resin.

Various additives such as a radical initiator and photosensitizer can be incorporated into the oxygen-absorbing resin composition of the present invention.

The radical initiators and photosensitizers usable herein are those generally known as photo initiators, for example, benzoin and alkyl ethers thereof such as benzoin, benzoin methyl ether, benzoin ethyl ether and benzoin isopropyl ether; acetophenone compounds such as acetophenone, 2,2-dimethoxy-2-phenylacetophenone, 2,2-diethoxy-2-phenylacetophenone, 1,1-dichloroacetophenone, 1-hydroxycyclohexyl phenyl ketone, 2-hydroxycyclohexyl phenyl ketone and 2-methyl-1-[4-(methylthio)phenyl]-2-morpholinopropane-1-on; anthraquinones such as 2-methylanthraquinone and 2-amylanthraquinone; thioxanthones such as 2,4-dimethylthioxanthone, 2,4-diethylthioxanthone, 2-chlorothioxanthone and 2,4-diisopropylthioxanthone; ketals such as acetophenone dimethyl ketal and benzyl dimethyl ketal; benzophenone compounds such as benzophenone; and xanthones. The photo radical initiators can be used in combination with one or more of known, ordinary photo polymerization accelerators such as benzoic acid compounds and tertiary amines.

Other additives include fillers, colorants, heat stabilizers, weather stabilizers, antioxidants, age resistors, light stabilizers, ultraviolet absorbers, antistatic agents, lubricants such as metallic soaps and waxes, modifying resins and rubbers. These additives can be incorporated into the resin composition by a method well known per se. For example, by using the lubricant in this way, the bite of the resin into a screw can be improved. The ordinary lubricants include metallic soaps such as magnesium stearate and calcium stearate; hydrocarbon lubricants such as liquid, natural or synthetic paraffins, micro waxes, polyethylene wax and polyethylene chloride wax; fatty acids such as stearic acid and lauric acid; aliphatic acid monoamides or bisamides such as stearamide, palmitamide, oleamide, methylene bisstearoamide and ethylene bisstearoamide; esters such as butyl stearate, cured castor oil and ethylene glycol monostearate; and mixtures of them. The suitable amount of the lubricant is in the range of 50 to 1,000 ppm per an amount of the polyamide.

The oxygen-absorbing composition of the present invention is usable in the form of a powder, granules or sheet for the oxygen absorption in a sealed package. This oxygen-absorbing composition can also be incorporated into a resin or rubber for forming liners, gaskets or coatings to absorb oxygen remaining in the package. The oxygen-absorbing composition can further be used in manufacturing packages as a packaging material in the form of a film or sheet or a container such as a packing container in the form of a cup, tray, bottle, tubular container or the like.

The oxygen-absorbing resin composition of the present invention is preferably used in the form of a laminate comprising at least one layer containing the composition and other resin layers.

[Laminate]

The laminate of the present invention contains at least one layer containing the above-described oxygen-absorbing resin composition (hereinafter referred to as the oxygen-absorbing layer). The "layer containing the oxygen-absorbing resin composition" includes a layer comprising only the above-described oxygen-absorbing resin composition and also a layer comprising the oxygen-absorbing resin composition and another resin as the base.

The resin layer, other than the oxygen-absorbing layer, constituting the laminate can be suitably selected from the group consisting of layers of thermoplastic resins and thermosetting resins depending on the mode of the use and the required function of the laminate. The resins constituting the laminate are, for example, olefin resins, thermoplastic polyester resins and oxygen barrier resins.

The olefin resins include, for example, low-density polyethylene (LDPE), medium-density polyethylene (MDPE), high-density polyethylene (HDPE), linear low-density polyethylene (LLDPE), linear very low-density polyethylene (LV-LDPE), polypropylene (PP), ethylene/propylene copolymer, polybutene-1, ethylene/butane-1 copolymer, propylene/butane-1 copolymer, ethylene/propylene/butane-1 copolymer, ethylene/vinyl acetate copolymer and ion crosslinked olefin copolymer (ionomer) as well as blends of them.

The thermoplastic polyester resins include, for example, polyethylene terephthalate (PET), polybutylene terephthalate (PBT) and polyethylene naphthalate (PEN) as well as copolymer polyesters and blends of them.

The oxygen barrier resins include ethylene/vinyl alcohol copolymer (EVOH). For example, a saponified copolymer obtained by saponifying an ethylene/vinyl acetate copolymer having an ethylene content of 20 to 60 molar %, preferably 25 to 50 molar %, to attain a degree of saponification of at least 96 molar %, preferably at least 99 molar %, is used.

The saponified ethylene vinyl alcohol copolymer has such a molecular weight as to form a film. This copolymer has a viscosity of at least 0.01 dl/g, preferably at least 0.05 dl/g, as determined in a mixed solvent of phenol and water in a weight ratio of 85:15 at 30° C.

Other examples of the oxygen barrier resins are polyamide resins such as polymethaxylidene adipamide (MXD6) and polyester resins such as polyglycolic acid.

The structure of the laminate of the present invention can be suitably selected depending on the mode of the use and the required function. For example, the laminates have the following structures wherein OAR represents an oxygen-absorbing layer:

Two-layer structure: PET/OAR, PE/OAR, OPP/OAR,
Three-layer structure: PE/OAR/PET, PET/OAR/PET, PE/OAR/OPP, EVOH/OAR/PET, PE/OAR/COC,
Four-layer structure: PE/PET/OAR/PET, PE/OAR/EVOH/PET, PET/OAR/EVOH/PET, PE/OAR/EVOH/COC, PE/OAR/EVOH/PE,
Five-layer structure: PET/OAR/PET/OAR/PET, PE/PET/OAR/EVOH/PET, PET/OAR/EVOH/COC/PET, PET/OAR/PET/COC/PET, PE/OAR/EVOH/COC/PET, PE/EVOH/OAR/EVOH/PE, PP/EVOH/OAR/EVOH/PP,
Six-layer structure: PET/OAR/PET/OAR/EVOH/PET, PE/PET/OAR/COC/EVOH/PET, PET/OAR/EVOH/PET/COC/PET, PE/EVOH/OAR/PE/EVOH/PE, PP/EVOH/OAR/PP/EVOH/PP, and
Seven-layer structure: PET/OAR/COC/PET/EVOH/OAR/PET.

PE represents low-density polyethylene (LDPE), medium-density polyethylene (MDPE), high-density polyethylene (HDPE), linear low-density polyethylene (LLDPE) or linear very low-density polyethylene (LVLDPE).

In these structures, a structure having at least one oxygen barrier layer is preferred because the life of the oxygen absorbing layer can be elongated in this structure.

If necessary, an adhesive resin can be placed between the resin layers in this laminate. The adhesive resins include carboxylic acids, carboxylic acid anhydrides and polymers containing 1 to 700 meq/100 g resin, preferably 10 to 500 meq/100 g resin, of a carboxylic acid in the main chain or side chain.

The adhesive resins include, for example, ethylene/acrylic acid copolymer, ion crosslinked olefin copolymers, maleic anhydride graft polyethylene, maleic anhydride graft polypropylene, acrylic acid graft polyolefins, ethylene/vinyl acetate copolymer, copolymer polyesters and copolymer polyamides. A combination of two or more of them can also be used.

These adhesive resins are useful for the lamination by the co-extrusion, sandwich lamination or the like. A thermosetting adhesive resin such as an isocyanate or epoxy resin is also usable for the adhesive lamination of a previously molded gas barrier resin film and a moisture-proof resin film.

A co-extrusion method known per se can be employed for the production of the laminate. The laminate can be produced by, for example, the extrusion molding with a multi-layer multi-mold die and extruders in a number which varies depending on the kinds of the resins.

Thus, laminates can be molded into films, sheets, bottles, cups, caps, tube-forming parisons or pipes and preforms for forming bottles or tubes.

Packaging materials such as films can be used in the form of packaging bags of various shapes such as ordinary pouches having 3 or 4 sealed sides, pouches with gussets, standing pouches and billow packaging bags. The bags can be produced by a well-known bag molding method.

Bottles can be easily produced by pinching off the parison, pipe or preform with a pair of split molds and blowing the liquid therein. Stretched blown bottles and the like can be obtained by cooling the pipe or preform, heating it to a stretching temperature and stretching it in the axial direction and simultaneously blow-stretching it in the peripheral direction.

Further, packaging containers such as cups and trays can be obtained from the film or sheet by vacuum forming, air-pressure forming, bulging forming, plug assist molding or the like.

Multi-layer injection moldings can be produced by a co-injection method or successive injection method by using injection molding machines, the number used varying depending on the kinds of the resins.

The multi-layer films and multi-layer sheets can be produced by an extrusion coating method or sandwich lamination method. These multi-layer films and multi-layer sheets can be produced also by the dry lamination of previously formed films.

The laminates of the present invention are preferably usable for producing packaging materials or packaging containers because they effectively cut off oxygen. The laminates are useful for producing packages capable of preventing the contents thereof from deteriorating in flavor and taste and elongating the shelf life of the contents for a long period of time because they can absorb oxygen for a long period of time.

The laminates of the present invention are particularly useful as packaging materials for drinks such as beers, wines, fruit juices and soft carbonate drinks, foods such as fruits, nuts, vegetables, meat products, foods for infants, coffee, jams, mayonnaise, ketchup, cooking oils, dressings, sauces, foods boiled in soy sauce and dairy products, as well as medicines, cosmetics and gasoline.

The following Examples will further illustrate the present invention, which by no means limit the invention.

EXAMPLES

Determination of Carbon-to-Carbon Double Bond Content of Styrene/Diene Copolymer A resin was dissolved in heavy chloroform to obtain a solution having a concentration of 10 to 15 wt. % and then the structure of the resin was spectrally identified by 13C-NMR determination (JNM-EX270, a product of JEOL). The carbon-to-carbon double bond content was determined by calculating the molar number (eq/g) of a double bond contained in 1 g of the resin.

[Method of Observing the State of Dispersion of Resin (B) in the Oxygen Absorbing Resin Composition]

The oxygen absorbing resin composition was embedded in an epoxy/amine embedding resin for an electron microscope and then the embedding resin was cured. The embedding resin was abraded and scraped with a microtome to obtain a cross section of the samples of the oxygen-absorbing resin composition. The cross section sample of the embedded resin was finished by the abrasion with an ultramicrotome. SEM photographs of the finish-abraded section were taken with a scanning electron microscope (JSM-6300F, a product of JEOL) to observe the dispersion state of resin (B) in the oxygen absorbing resin composition.

1. Oxygen Absorbing Resin Composition

Example 1

100 parts by weight of a low-density polyethylene resin [JB221R; a product of Japan Polyolefin Co., Ltd.] were mixed with 5 parts by weight of a styrene resin [HRM 24N; a product of Toyo Styrene Co., Ltd.] and 350 ppm (in terms of cobalt) of cobalt neodecanoate [DICNATE 5000; a product of Dainippon Ink and Chemicals, Inc.] as a transition metal catalyst.

The obtained mixture was previously kneaded with a stirring dryer [a product of DALTON corporation] and then fed into a double-screw extruder (TEM 37, a product of Toshiba Machine Co., Ltd.) through a hopper with a quantitative feeder. The mixture was thus extruded in the form of a strand at a rotation rate of 100 RPM at 210° C. and then pelletized.

The pellets thus obtained were pulverized with a freeze pulverizer and then an amount of the pellets was measured. The powder thus obtained was placed in a 85 ml container impermeable to oxygen [hi-Retoflex: HR 78-84 polypropylene/steel foil/polypropylene laminated cup-shaped containers of Toyo Seikan Kaisha, Ltd.] together with 1.0 ml of distilled water. The container was heat-sealed with a lid material composed of polypropylene (inner layer)/aluminum foil/polyester (outer layer) and then stored at 50° C. The oxygen concentration in the container was determined with a gas chromatograph [GC-8A, a product of Shimadzu Corporation] at time intervals to calculate oxygen absorption (cc/g). The results are shown in Table 2. A section of each pellet was observed and it was found that the styrene resin was homogeneously dispersed in the low-density polyethylene resin matrix.

Example 2

Pellets were prepared in the same manner as that in Example 1 except that the styrene resin was replaced with a styrene/isoprene/styrene triblock copolymer resin having a styrene content of 15% by weight [SIS 5200; product of JSR Co., Ltd. having a carbon-to-carbon double content of 0.014 eq/g]. Then the oxygen concentration in the container was determined and oxygen absorption (cc/g) was calculated in the same manner as that in Example 1. The results are shown in Table 2. A section of each pellet was observed in the same manner as that in Example 1 and it was found that the styrene/isoprene/styrene triblock copolymer resin was homogeneously dispersed in the low-density polyethylene resin matrix.

Example 3

Pellets were prepared in the same manner as that in Example 2 except that the low-density polyethylene resin was replaced with a linear low-density polyethylene resin [ULTZEX 2020SB; Mitsui Sumitomo Polyolefin Co., Ltd.]. Then the oxygen concentration in the container was determined and oxygen absorption (cc/g) was calculated in the same manner as that in Example 2. The results are shown in Table 2. A section of each pellet was observed in the same manner as that in Example 1 and it was found that the styrene/isoprene/styrene triblock copolymer resin was homogeneously dispersed in the linear low-density polyethylene resin matrix.

Example 4

Pellets were prepared in the same manner as that in Example 2 except that the low density polyethylene resin was replaced with a high density polyethylene resin [KZ 145N; a product of Japan Polyolefin Co., Ltd.]. Then the oxygen concentration in the container was determined and oxygen absorption (cc/g) was calculated in the same manner as that in Example 2. The results are shown in Table 2. A section of each pellet was observed in the same manner as that in Example 1 and it was found that the styrene/isoprene/styrene triblock copolymer resin was homogeneously dispersed in the high-density polyethylene resin matrix.

Comparative Example 1

Pellets were prepared in the same manner as that in Example 1 except that the styrene resin [HRM24N; a product of Toyo Styrene Co., Ltd.] was not used. Then the oxygen concentration in the container was determined and oxygen absorption (cc/g) was calculated in the same manner as that in Example 1. The results are shown in Table 2.

Comparative Example 2

Pellets were prepared in the same manner as that in Comparative Example 1 except that the low-density polyethylene resin was replaced with linear low-density polyethylene resin [ULTZEX 2020SB; Mitsui Sumitomo Polyolefin Co., Ltd.]. Then the oxygen concentration in the container was determined and oxygen absorption (cc/g) was calculated in the same manner as that in Comparative Example 1. The results are shown in Table 2.

Comparative Example 3

Pellets were prepared in the same manner as that in Comparative Example 1 except that the low-density polyethylene resin was replaced with high-density polyethylene resin [KZ 145N; a product of Japan Polyolefin Co., Ltd.]. Then the oxygen concentration in the container was determined and oxygen absorption (cc/g) was calculated in the same manner as that in Comparative Example 1. The results are shown in Table 2.

TABLE 2

| | Oxygen absorption (cc/g) | | | |
|---|---|---|---|---|
| | After 2 days | After 7 days | After 14 days | After 30 days |
| Ex. 1 | 0.0 | 0.5 | 24.1 | 60.0 |
| Ex. 2 | 13.5 | 27.5 | 47.6 | 87.2 |
| Ex. 3 | 11.9 | 26.6 | 47.0 | 86.8 |
| Ex. 4 | 10.9 | 25.8 | 45.5 | 86.5 |
| Comp. Ex. 1 | 0.0 | 0.0 | 0.0 | 11.9 |
| Comp. Ex. 2 | 0.0 | 0.0 | 0.0 | 9.5 |
| Comp. Ex. 3 | 0.0 | 0.0 | 0.0 | 0.0 |

2. Laminates

Example 5

Four kinds of 6-layered bottles having a mouth diameter of 45 mm and a capacity of 150 ml and being made of the oxygen-absorbing resin composition pelletized in Example 2, a low-density polyethylene resin [JB221R; a product of Japan Polyolefin Co., Ltd.], an adhesive resin [MODIC L522; a product of Mitsubishi Chemical Corporation] and a barrier resin [EVAL F101B; a product of Kuraray Co., Ltd.], were produced by a well-known melt blow molding method.

The layer structure of the products was as follows:
Outside: polyethylene layer/adhesive layer/barrier layer/adhesive layer/oxygen-absorbing layer/polyethylene layer
Weight %: 20/2.5/5/2.5/5/65

For evaluating the oxygen cutting off property of the multi-layer bottle, 1 ml of distilled water was fed into the container produced in Example 1 and impermeable to oxygen for evaluating the oxygen impermeability of the multi-layer bottle. The mouth of the bottle was tightly heat-sealed with the same lid material as that used in Example 1 in nitrogen atmosphere. The initial oxygen concentration in the container was 0.02% or below. After keeping the container at 30° C. and 80% RH, the oxygen concentration in the container was determined with a gas chromatograph [GC-8A; a product of Shimadzu Corporation] at time intervals. The results are shown in Table 3.

Comparative Example 4

Four kinds of 6-layered bottles having a capacity of 150 ml were produced by using the oxygen-absorbing resin composition pelletized in Comparative Example 1, a low-density polyethylene resin [JB221R; a product of Japan Polyolefin Co., Ltd.], an adhesive resin [MODIC L522; a product of Mitsubishi Chemical Corporation] and a barrier resin [EVAL F101B; a product of Kuraray Co., Ltd.] in the same manner as that in Example 3. The oxygen cutting off property of the bottles was then determined. The results are shown in Table 3.

TABLE 3

| | Amount of oxygen in container (cc/bottle) | | | |
|---|---|---|---|---|
| | After 14 days | After 1 month | After 3 months | After 5 months |
| Ex. 5 | 0.0 | 0.0 | 0.0 | 0.07 |
| Comp. Ex. 4 | 0.20 | 0.44 | 1.43 | 2.25 |

What is claimed is:

1. An oxygen-absorbing resin composition comprising a matrix resin (A) selected from the group consisting of a low-density polyethylene and a linear low-density polyethylene, resin (B) which is a styrene block copolymer containing 15 to 50% by weight of the styrene moiety and transition metal catalyst (C), wherein said composition has a resin (B) content of 2.5 to 7.5% by weight and resin (B) is dispersed in the matrix of resin (A) so that the oxidation reaction of matrix resin (A) is caused and thus oxygen is absorbed by resin (A) when the oxygen-absorbing resin composition is brought into contact with oxygen.

2. The oxygen-absorbing resin composition according to claim 1 wherein transition metal catalyst (C) is contained in at least resin (A).

3. The oxygen-absorbing resin composition according to claim 1 wherein said composition has a resin (A) content of 92.5 to 97.5% by weight.

4. The oxygen-absorbing resin composition according to claim 1 wherein the styrene copolymer is a block copolymer having a polystyrene block at an end of a molecule.

5. The oxygen-absorbing resin composition according to claim 1 wherein the styrene copolymer is a block copolymer having an isoprene unit.

6. The oxygen-absorbing resin composition according to claim 5 wherein the block copolymer having the isoprene unit is styrene/isoprene/styrene triblock copolymer.

7. The oxygen-absorbing resin composition according to claim 1 wherein said composition contains 0.001 eq/g or less of carbon-to-carbon double bond other than those of benzene ring.

8. The oxygen-absorbing resin composition according to claim 1 wherein said composition contains 10 to 3,000 ppm, based on the weight of metal, of a transition metal catalyst.

9. An oxygen-absorbing sheet containing the oxygen absorbing resin composition of claim 1.

10. A laminate having at least one layer containing the oxygen-absorbing resin composition of claim 1.

11. The laminate according to claim 10, which further has at least one oxygen barrier layer.

12. An oxygen-absorbing resin composition containing a polyolefin matrix resin (A) selected from the group consisting of a low-density polyethylene and a linear low-density polyethylene, resin (B) which is a styrene block copolymer containing 15 to 50% by weight of the styrene moiety and having a polystyrene block at an end of a molecule and transition metal catalyst (C), wherein said composition has a resin (B) content of 2.5 to 7.5% by weight; wherein resin (B) is dispersed in matrix resin (A), and wherein matrix resin (A) absorbs oxygen when the oxygen-absorbing resin composition is brought into contact with oxygen.

* * * * *